(12) United States Patent
Danilov et al.

(10) Patent No.: US 10,372,560 B2
(45) Date of Patent: Aug. 6, 2019

(54) CLOUD STORAGE WRITE CACHE MANAGEMENT SYSTEM AND METHOD

(71) Applicant: EMC IP Holding Company LLC, Hopkinton, MA (US)

(72) Inventors: Mikhail Danilov, Saint Petersburg (RU); Andrey Fomin, Vesevolozhsk (RU); Mikhail Malygin, Saint Petersburg (RU); Vladimir Prikhodko, Saint Petersburg (RU); Alexander Rakulenko, Seattle, WA (US); Maxim Trusov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 15/447,880

(22) Filed: Mar. 2, 2017

(65) Prior Publication Data

US 2017/0371752 A1    Dec. 28, 2017

(51) Int. Cl.
*G06F 11/14*    (2006.01)
*G06F 11/30*    (2006.01)

(52) U.S. Cl.
CPC ...... *G06F 11/1471* (2013.01); *G06F 11/3034* (2013.01); *G06F 2201/82* (2013.01); *G06F 2201/885* (2013.01)

(58) Field of Classification Search
CPC .. G06F 11/1471; G06F 11/1464; G06F 11/14; G06F 11/1469; G06F 11/0751; G06F 11/0727; G06F 11/0745; G06F 11/0778
See application file for complete search history.

(56) References Cited

U.S. PATENT DOCUMENTS

| | | | | |
|---|---|---|---|---|
| 7,305,584 | B2 * | 12/2007 | Eguchi | G06F 11/142 707/999.202 |
| 9,229,870 | B1 * | 1/2016 | Kumar | G06F 12/0868 |
| 9,772,894 | B2 * | 9/2017 | Parnell | G06F 11/0778 |
| 9,842,053 | B2 * | 12/2017 | Joshi | G06F 12/0804 |
| 2005/0028022 | A1 * | 2/2005 | Amano | G06F 11/1471 714/2 |
| 2011/0113017 | A1 * | 5/2011 | LaBerge | G06F 17/30227 707/690 |
| 2014/0281131 | A1 * | 9/2014 | Joshi | G06F 12/0804 711/103 |
| 2016/0224277 | A1 * | 8/2016 | Batra | G06F 3/0653 |

* cited by examiner

*Primary Examiner* — Nadeem Iqbal
(74) *Attorney, Agent, or Firm* — Brian J. Colandreo; Mark H. Whittenberger; Holland & Knight LLP (57) ABSTRACT

A method, computer program product, and computer system for monitoring health of at least one storage device of a cache in a clustered system. A recovery journal may be maintained, wherein the recovery journal may identify whether one or more chunks of data stored in the cache have been dumped from the at least one storage device to persistent storage in the clustered system. A state of the at least one storage device may be determined based upon, at least in part, the health of the at least one storage device. A recovery action may be performed on the one or more chunks of data stored in the at least one storage device based upon, at least in part, the state of the at least one storage device.

15 Claims, 7 Drawing Sheets

CLOUD STORAGE WRITE CACHE MANAGEMENT SYSTEM AND METHOD

RELATED APPLICATION

The subject application claims the priority of Russia Patent Application No. 2016124790, filed on 22 Jun. 2016, the contents of which are herein incorporated by reference in its entirety.

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to monitoring health of at least one storage device of a cache in a clustered system. A recovery journal may be maintained, wherein the recovery journal may identify whether one or more chunks of data stored in the cache have been dumped from the at least one storage device to persistent storage in the clustered system. A state of the at least one storage device may be determined based upon, at least in part, the health of the at least one storage device. A recovery action may be performed on the one or more chunks of data stored in the at least one storage device based upon, at least in part, the state of the at least one storage device.

One or more of the following example features may be included. In some implementations, the state of the at least one storage device may be determined to be a first state if at least one I/O request directed to the at least one storage device fails. In other implementations, the recovery action may include attempting to dump each of the one or more chunks of data stored in the at least one storage device to the persistent storage if the state of the at least one storage device is the first state, wherein each chunk of data successfully dumped is removed from the recovery journal. In certain implementations, the recovery action may further include recovering at least a portion of the one or more chunks of data that remain in the recovery journal. In some implementations, the state of the at least one storage device may be determined to be a second state if the at least one storage device is incapable of completing I/O requests. In certain implementations, the recovery action may include: invalidating at least a portion of the one or more chunks of data stored in the at least one storage device if the state of the at least one storage device is the second state; and recovering at least a portion of the one or more chunks of data that remain in the recovery journal. In some implementations, the recovery action may include restoring the recovery journal from a file system on the at least one storage device if the recovery journal is one of corrupted and lost.

In another example implementation, a computing system may include one or more processors and one or more memories configured to perform operations that may include but are not limited to monitoring health of at least one storage device of a cache in a clustered system. A recovery journal may be maintained, wherein the recovery journal may identify whether one or more chunks of data stored in the cache have been dumped from the at least one storage device to persistent storage in the clustered system. A state of the at least one storage device may be determined based upon, at least in part, the health of the at least one storage device. A recovery action may be performed on the one or more chunks of data stored in the at least one storage device based upon, at least in part, the state of the at least one storage device.

One or more of the following example features may be included. In some implementations, the state of the at least one storage device may be determined to be a first state if at least one I/O request directed to the at least one storage device fails. In other implementations, the recovery action may include attempting to dump each of the one or more chunks of data stored in the at least one storage device to the persistent storage if the state of the at least one storage device is the first state, wherein each chunk of data successfully dumped is removed from the recovery journal. In certain implementations, the recovery action may further include recovering at least a portion of the one or more chunks of data that remain in the recovery journal. In some implementations, the state of the at least one storage device may be determined to be a second state if the at least one storage device is incapable of completing I/O requests. In certain implementations, the recovery action may include: invalidating at least a portion of the one or more chunks of data stored in the at least one storage device if the state of the at least one storage device is the second state; and recovering at least a portion of the one or more chunks of data that remain in the recovery journal. In some implementations, the recovery action may include restoring the recovery journal from a file system on the at least one storage device if the recovery journal is one of corrupted and lost.

In another example implementation, a computer program product may reside on a computer readable storage medium having a plurality of instructions stored thereon which, when executed across one or more processors, may cause at least a portion of the one or more processors to perform operations that may include but are not limited to monitoring health of at least one storage device of a cache in a clustered system. A recovery journal may be maintained, wherein the recovery journal may identify whether one or more chunks of data stored in the cache have been dumped from the at least one storage device to persistent storage in the clustered system. A state of the at least one storage device may be determined based upon, at least in part, the health of the at least one storage device. A recovery action may be performed on the one or more chunks of data stored in the at least one storage device based upon, at least in part, the state of the at least one storage device.

One or more of the following example features may be included. In some implementations, the state of the at least one storage device may be determined to be a first state if at least one I/O request directed to the at least one storage device fails. In other implementations, the recovery action may include attempting to dump each of the one or more chunks of data stored in the at least one storage device to the persistent storage if the state of the at least one storage device is the first state, wherein each chunk of data successfully dumped is removed from the recovery journal. In certain implementations, the recovery action may further include recovering at least a portion of the one or more chunks of data that remain in the recovery journal. In some implementations, the state of the at least one storage device may be determined to be a second state if the at least one storage device is incapable of completing I/O requests. In certain implementations, the recovery action may include:

invalidating at least a portion of the one or more chunks of data stored in the at least one storage device if the state of the at least one storage device is the second state; and recovering at least a portion of the one or more chunks of data that remain in the recovery journal. In some implementations, the recovery action may include restoring the recovery journal from a file system on the at least one storage device if the recovery journal is one of corrupted and lost.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the intern& or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. In some implementations, each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
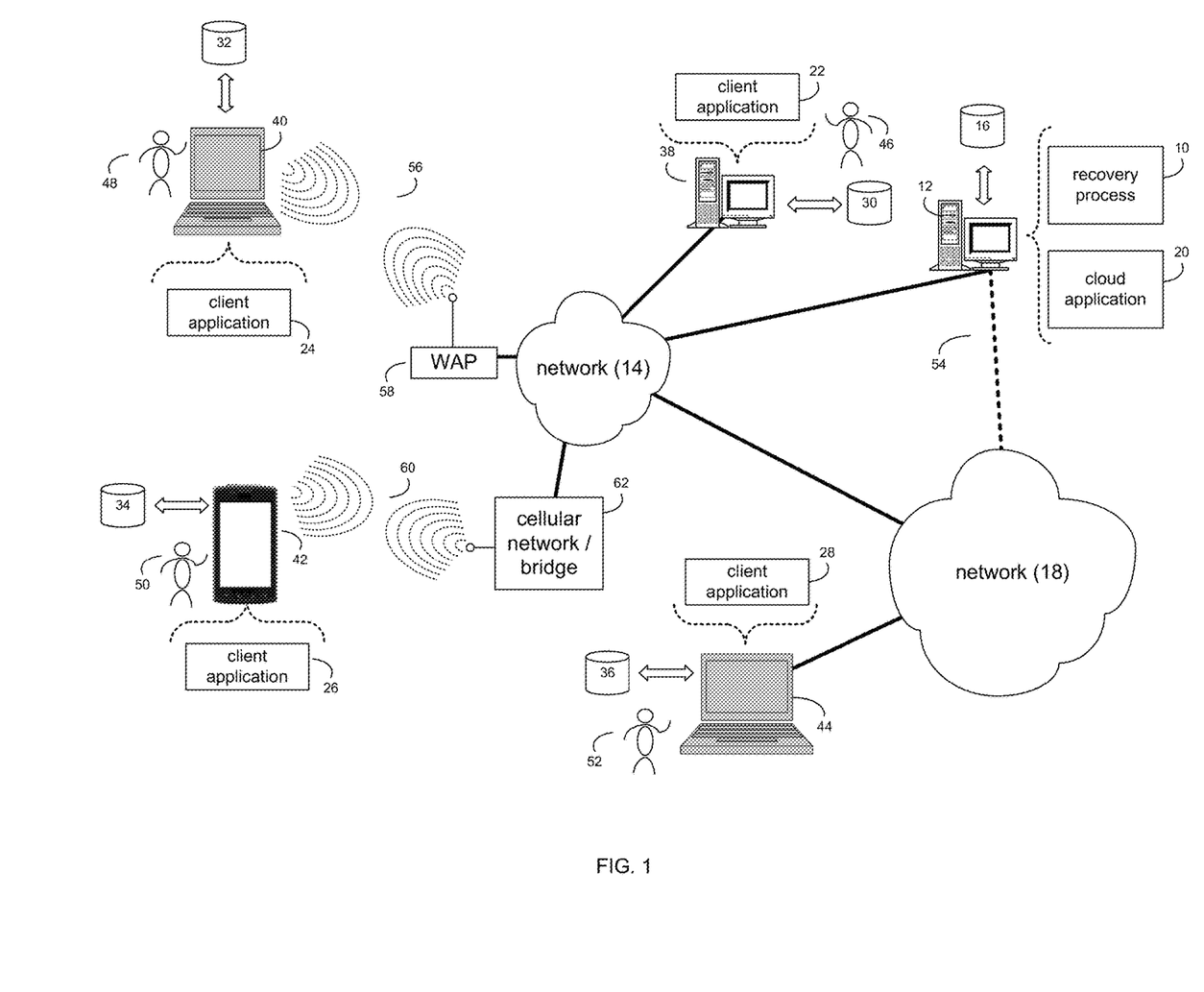
FIG. 1 is an example diagrammatic view of a recovery process coupled to a distributed computing network according to one or more example implementations of the disclosure.

Referring now to the example implementation of FIG. 1, there is shown recovery process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, a recovery process, such as the recovery process 10 of FIG. 1, may monitor health of at least one storage device of a cache in a clustered system. In certain implementations, a recovery journal may be maintained, wherein the recovery journal may identify whether one or more chunks of data stored in the cache have been dumped from the at least one storage device to persistent storage in the clustered system. In many implementations, a state of the at least one storage device may be determined based upon, at least in part, the health of the at least one storage device. In some implementations, a recovery action may be performed on the one or more chunks of data stored in the at least one storage device based upon, at least in part, the state of the at least one storage device.

In some implementations, the instruction sets and subroutines of recovery process, such as recovery process 10, which may be stored on a storage device, such as storage device 16 coupled to computer 12, may be executed by one or more processors and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In certain embodiments, a data store may also be a custom database, such as, for example, a flat file database or an XML database. In other embodiments another form(s) of a data storage structure and/or organization may also be used. In certain implementations, a recovery process may be a component of the data store, a standalone application that interfaces with the above noted data store and/or an applet/application that is accessed via client applications, such as client applications 22, 24, 26, 28. In many implementations, a data store may be, in whole or in part, distributed in a cloud computing topology. In certain implementations, computer 12 and storage device 16 may refer to multiple devices, which may also be distributed throughout the network. An example cloud computing environment that may be used with the disclosure may include but is not limited to, e.g., Elastic Cloud Storage (ECS™) from EMC Corporation of Hopkinton, Mass. In some implementations, other cloud computing environments may be used without departing from the scope of the disclosure.

In some implementations, computer 12 may execute a cloud application (e.g., cloud application 20), examples of which may include, but are not limited to, e.g., a storage system application, a cloud computing application, a data synchronization application, a data migration application, a data recovery application, or other application that allows for the implementation and/or management of data in a clustered (or non-clustered) environment (or the like). In certain embodiments, recovery process 10 and/or cloud application 20 may be accessed via client applications 22, 24, 26, 28. recovery process 10 may be a standalone application, or may be an applet/application/script/extension that may interact with and/or be executed within cloud application 20, a component of cloud application 20, and/or one or more of client applications 22, 24, 26, 28. In certain implementations, a cloud application may be a standalone application, or may be an applet/application/script/extension that may interact with and/or be executed within a recovery process, a component of recovery process, and/or one or more of client applications, such as client applications 22, 24, 26, 28. In some implementations, one or more of client applications 22, 24, 26, 28 may be a standalone application, or may be an applet/application/script/extension that may interact with and/or be executed within and/or be a component of recovery process 10 and/or cloud application 20. Examples of client applications 22, 24, 26, 28 may include, but are not limited to, e.g., a storage system application, a cloud computing application, a data synchronization application, a data migration application, a data recovery application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. In certain implementations, the instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

In some implementations, storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of recovery process 10 (and vice versa). Accordingly, in certain implementations, recovery process 10 may be a purely server-side application, a purely client-side application, or a hybrid server-side/client-side application that is cooperatively executed by one or more of client applications 22, 24, 26, 28 and/or recovery process 10.

In some implementations, one or more of client applications 22, 24, 26, 28 may be configured to effectuate some or all of the functionality of cloud application 20 (and vice versa). Accordingly, in different implementations, cloud application 20 may be a purely server-side application, a purely client-side application, or a hybrid server-side/client-side application that is cooperatively executed by one or more of client applications 22, 24, 26, 28 and/or cloud application 20. In some implementations, as one or more of client applications 22, 24, 26, 28, recovery process 10, and cloud application 20, taken singly or in any combination, may effectuate some or all of the same functionality, any description of effectuating such functionality via one or more of client applications 22, 24, 26, 28, recovery process 10, cloud application 20, or combination thereof, and any described interaction(s) between one or more of client applications 22, 24, 26, 28, recovery process 10, cloud application 20, or combination thereof to effectuate such functionality, should be taken as an example only and not to limit the scope of the disclosure.

In some implementations, users 46, 48, 50, 52 may access computer 12 and recovery process 10 (e.g., using one or more of client electronic devices 38, 40, 42, 44) directly through network 14 or through secondary network 18. Further, computer 12 may be connected to network 14 through secondary network 18, as illustrated with phantom link line 54. In certain implementations, recovery process 10 may include one or more user interfaces, such as browsers and textual or graphical user interfaces, through which users 46, 48, 50, 52 may access recovery process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
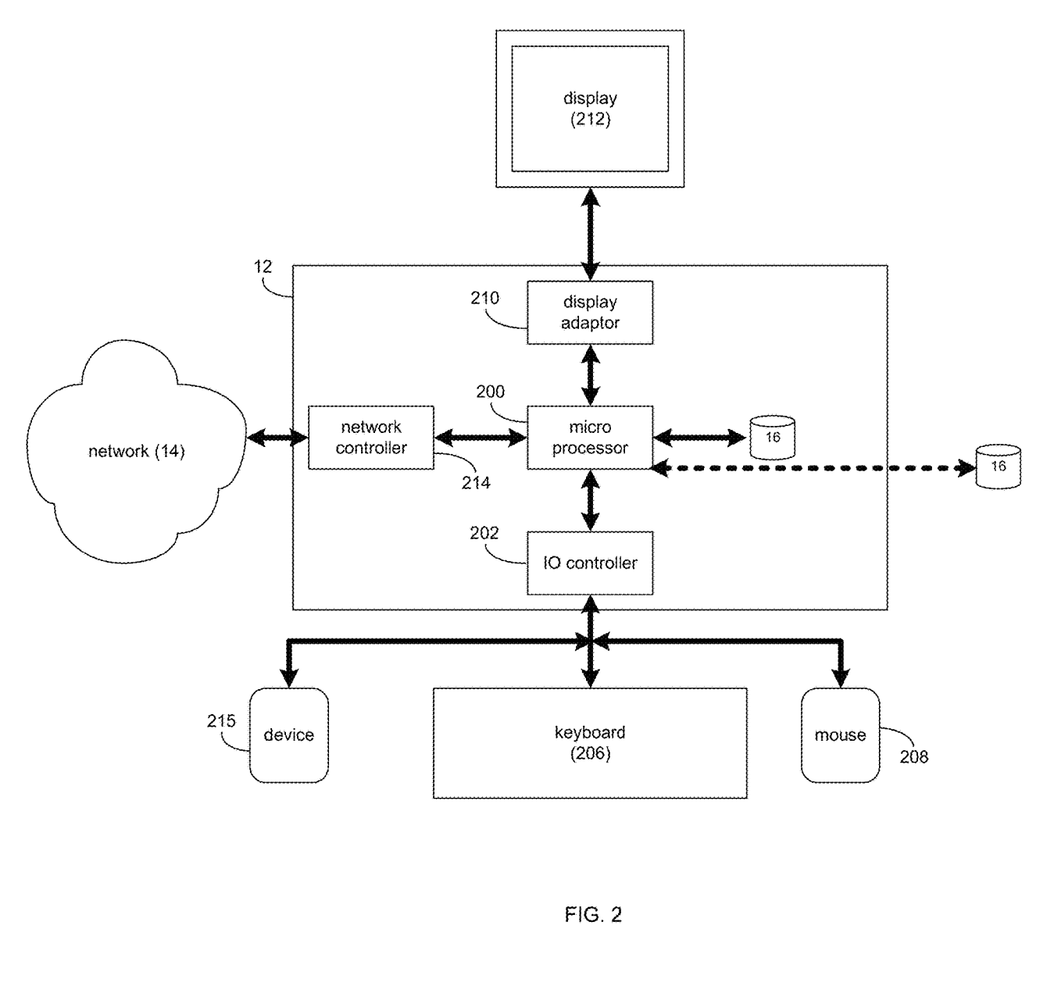
FIG. 2 is an example diagrammatic view of a client electronic device of FIG. 1 according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, any computing device capable of executing, in whole or in part, recovery process 10 may be substituted for computer 12 (in whole or in part) within FIG. 2, examples of which may include but are not limited to client electronic devices 38, 40, 42, 44.

In some implementations, computer 12 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 16). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 3:
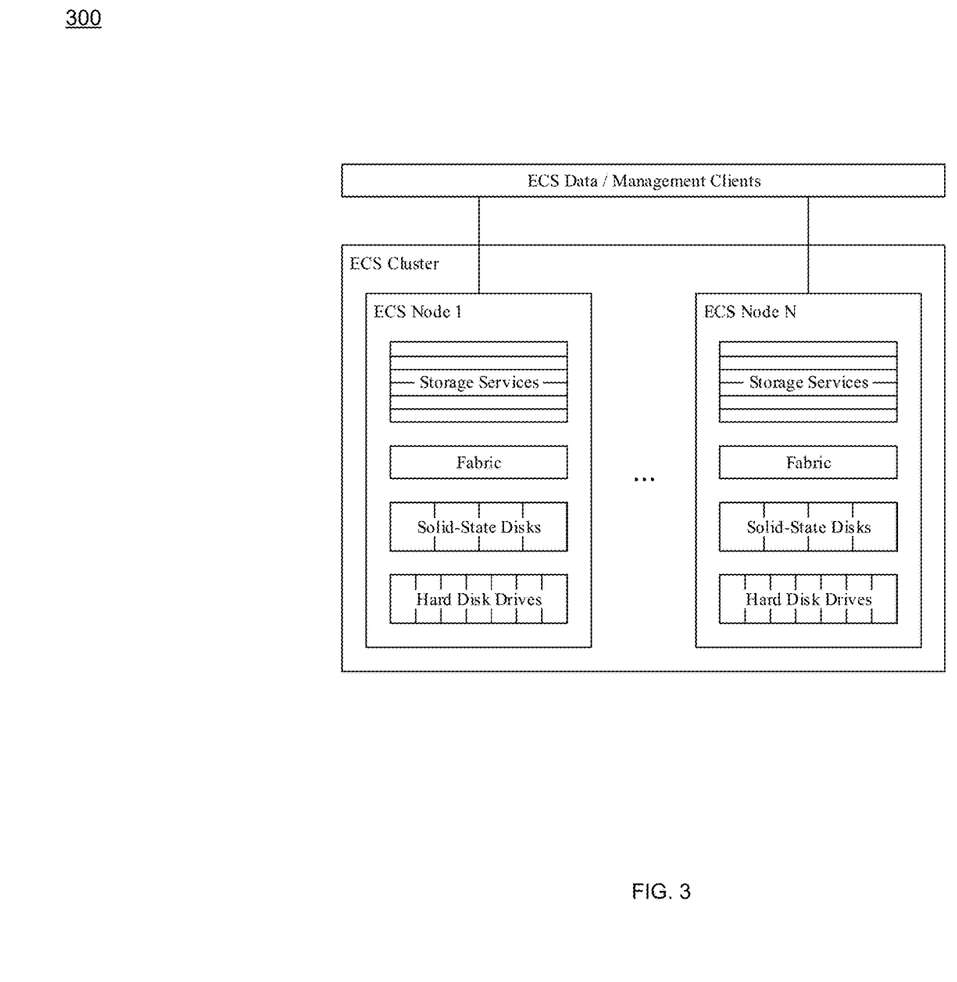
FIG. 3 is an example diagrammatic view of a high level architecture of a cluster according an example implementation of the disclosure.

Refer now to the example implementation of FIG. 3, in which cluster 300 consists of one or more storage nodes (e.g., hardware nodes). In this implementation, each storage node may manage (e.g., via recovery process 10 and/or cloud application 20) several storage devices. In some implementations, the storage devices of a cluster, such as cluster 300, may include, e.g., hard disk drives, aka HDDs, and/or solid state drives, aka SDDs. In other implementations, other types of storage devices may be used without departing from the scope of the disclosure.

In certain implementations, a single node of a cluster that runs on a hardware appliance may manage, e.g., from 15 to 60 storage devices, although more or less storage devices may also be managed. In some implementations, cluster 300 may include a "fabric" (or platform) that may provide services with an interface to HDDs, SSDs, operating system and other low level resources, etc. For instance, in some implementations, each node may run (e.g., via recovery process 10 and/or cloud application 20) a number of services, which may together implement a storage business logic. For instance, in some implementations, a single node may manage around 20 services, although more or less services may also be managed.

In some implementations, the HDDs may be used to store user data (e.g., comment, description, tag, etc.) and system metadata. For example, in certain implementations, user data may be content of a block/file/object received from a client application (such as client application 22 of FIG. 1). In certain implementations, search trees that may be used to keep the metadata may be large. In some implementations, tree updates may be very expensive on resources. Thus, in some implementations, journals, such as recovery journals, may be used. In some implementations, the journal may be a tree journal or other type of journal. In some implementations, the tree journal may be a binary tree, red-black tree, B-tree, or other type of tree. In further implementations, the journal may be a linear journal. In other implementations, a journal may be divided into structure containing data and a structure mapping that data. In some implementations, there may be a journal per search tree. In an implementation, when a journal contains enough information, a bulk update may be applied to the corresponding tree. In some implementations, journals may contain tree modification requests of the following example types: (1) Create a key, e.g., an object ID, with a value, e.g., the metadata associated with the object; (2) Update value for a key after some event, e.g., the application sent new metadata, or recovery process 10 (re)stored object content in some new chunk so object location information has changed; (3) Delete a key.

Figure 4:
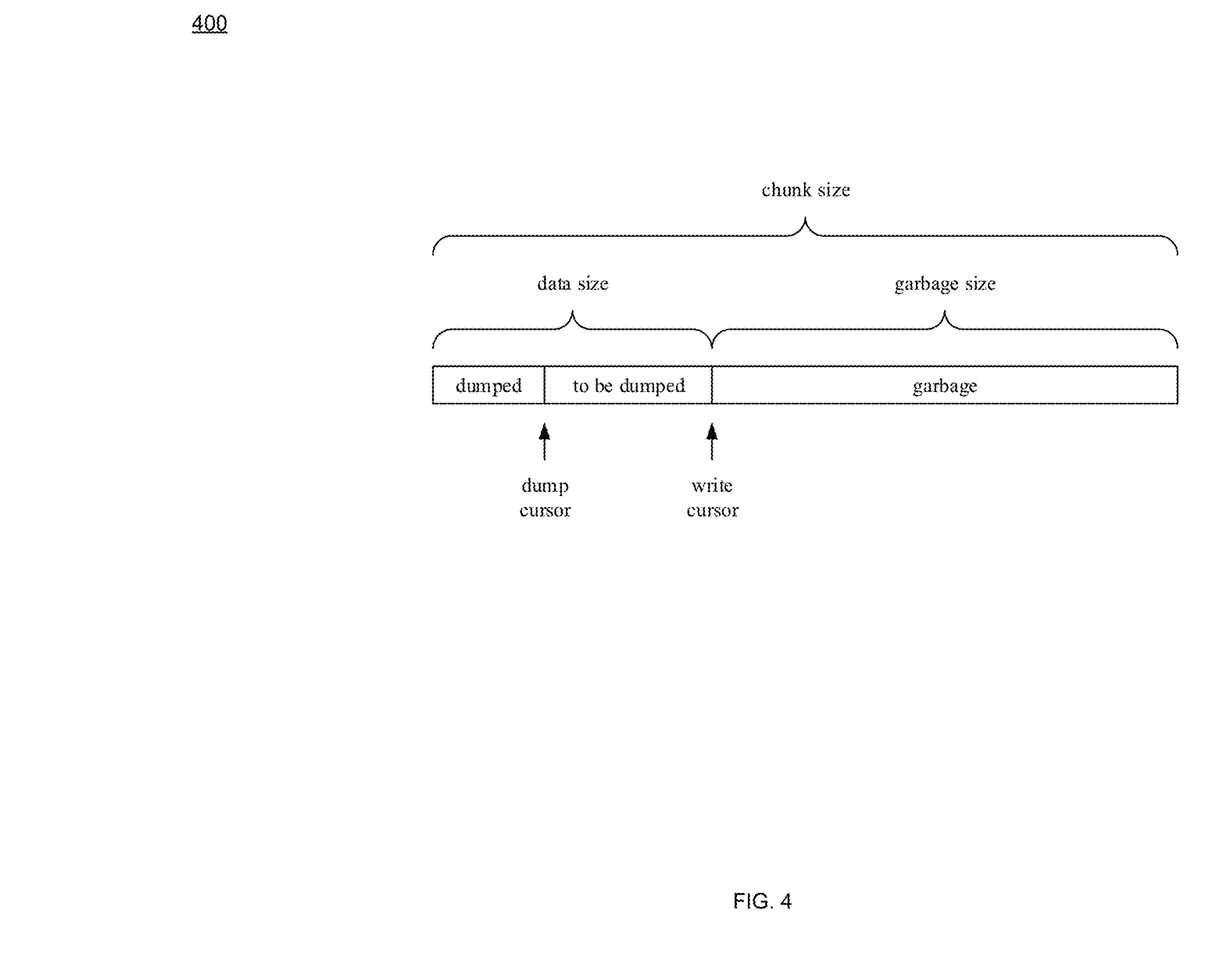
FIG. 4 is an example diagrammatic view of a data chunk according an example implementation of the disclosure.

Refer now to the example implementation of FIG. 4, recovery process may partition storage space into a set of blocks of fixed size called chunks, such as chunk 400. In some implementations, the information, user data and various kinds of metadata may be stored in these chunks. In various implementations, the manipulation performed over data may be done at the chunk level. For instance, in some implementations, replication and regeneration (aka recovery) may be done on a per chunk basis.

In some implementations, the write cache may work with data at the chunk level as well. In some implementations, from the physical layout point of view, the write cache may consist of a set of files, where each file may contain a single chunk. In other implementations, a cache file may contain some garbage at the end. In various implementations, data received at the SSD cache (e.g., cache data) from a client computing device may be dumped from the SSD cache to HDD in background and/or in parallel with data writing to the cache.

In some implementations, the first part of the file may be filled with data already written (e.g., dumped from SSD cache to HDD persistent storage). In other implementations, the second part of the file may contain garbage. In the example implementation of FIG. 4, chunk 400 may include a write cursor that points to the first byte of garbage, and a dump cursor. In some implementations, the dump cursor may point to the first byte that has not yet been dumped to HDD or to the first byte of garbage. In certain implementations, cache files with a dump cursor and a write cursor that line up together may be fully synchronized with HDD.

In certain implementations of a SSD-based cache, it may be allowed an increase in write performance. However, in various implementations, such a SSD-based cache may have high risk and overhead caused by straightforward write cache management. For example, in some implementations, one SSD may contain cached chunks that belong to one, several, or even all the HDDs connected to its particular node. Therefore, in certain implementations, any undiscovered issue with an SSD may be a threat of the node level. Generally, any discovered issue with an SSD, by default, may require recovery of the entire node to which the SSD belongs. In some implementations, as will be discussed in detail below, recovery process 10 may enable timely detection of hardware issues and minimal overhead associated with handling the detected issues.

Figure 5:
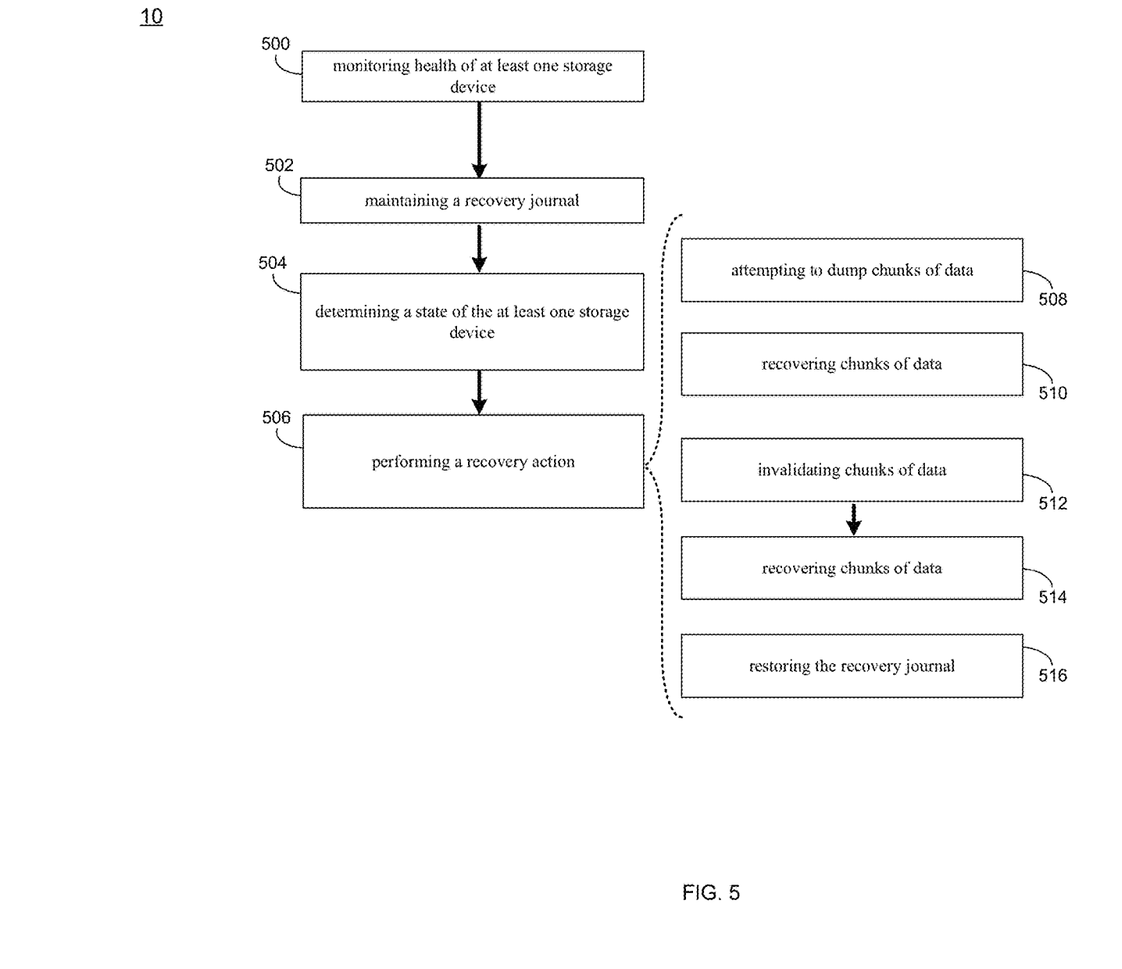
FIG. 5 is an example flowchart of a recovery process according to an example implementation of the disclosure.
Figure 6:
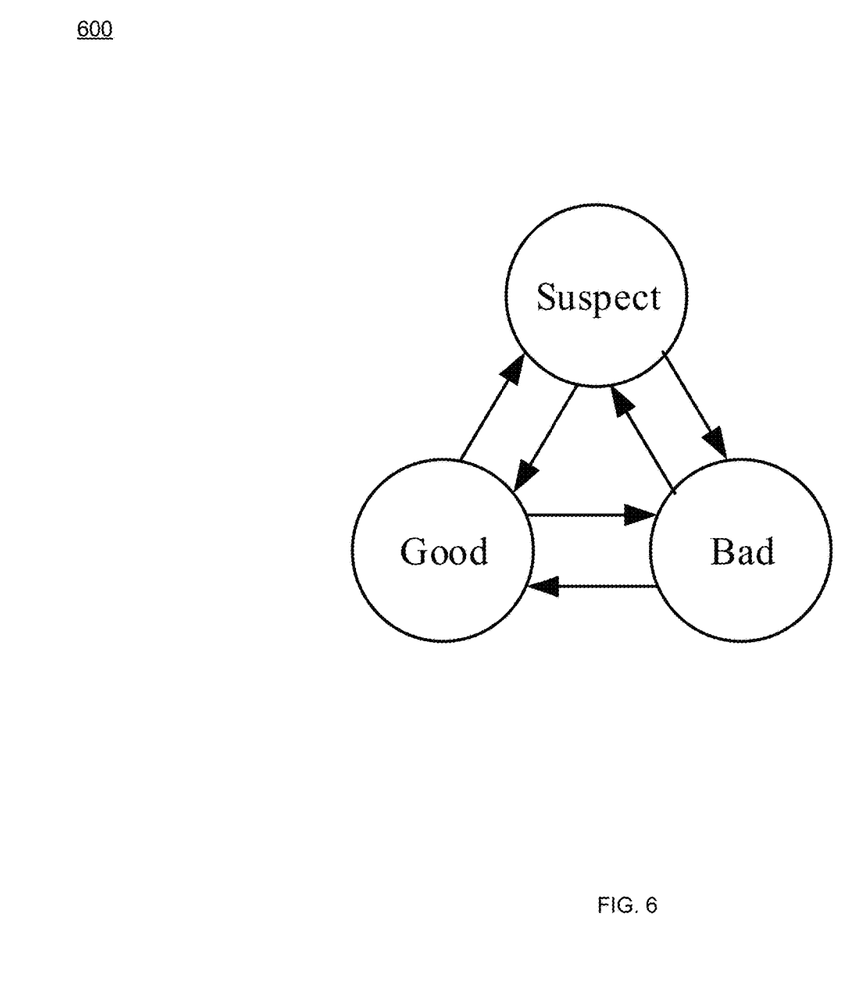
FIG. 6 is an example diagrammatic view of a state machine according an example implementation of the disclosure.
Figure 7:
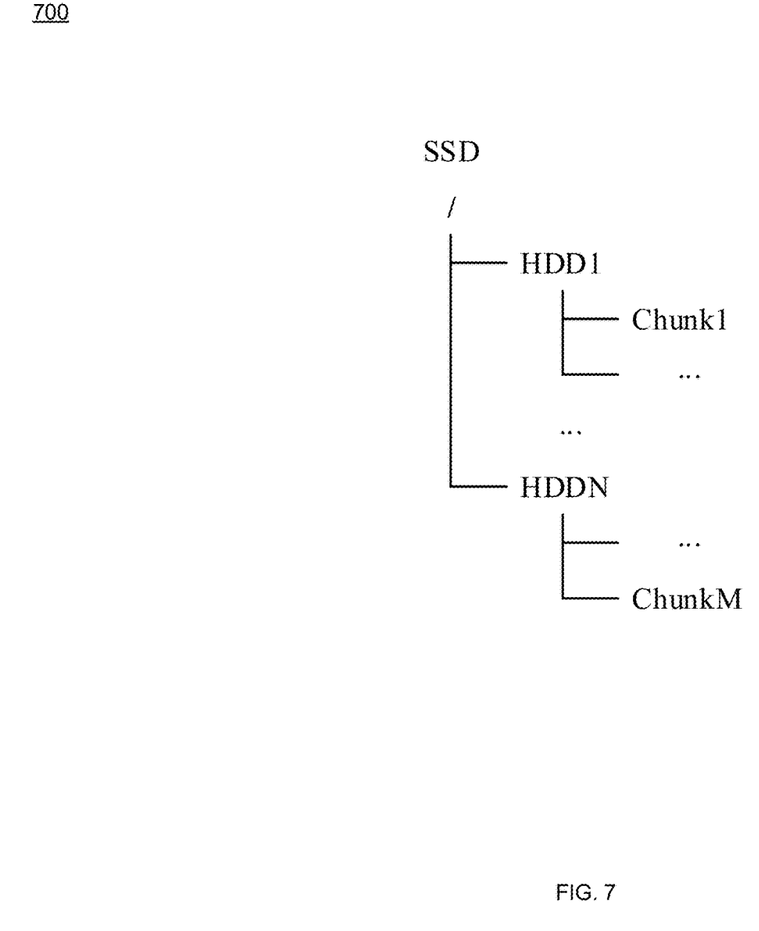
FIG. 7 is an example diagrammatic view of a file system layout according an example implementation of the disclosure.

The Recovery Process:

Referring now to the example implementations of FIGS. 5-7, a recovery process, such as the recovery process 10 of FIG. 1, may monitor 500 health of at least one storage device of a cache in a clustered system. In certain implementations, a recovery journal may be maintained 502 by recovery process 10, wherein the recovery journal may identify whether one or more chunks of data stored in the cache have been dumped from the at least one storage device to persistent storage in the clustered system. In many implementations, a state of the at least one storage device may be determined 504 by recovery process 10 based upon, at least in part, the health of the at least one storage device. In some implementations, recovery process 10 may perform 506 a recovery action on the one or more chunks of data stored in the at least one storage device based upon, at least in part, the state of the at least one storage device.

In some implementations, a recovery process, such as the recovery process 10 of FIG. 1, may monitor 500 health of at least one storage device (e.g., SSD) of a cache in a clustered system. For instance, recovery process 10 may include the ability to perform health monitoring, e.g., on the SSDs in the clustered system. In some implementations, an example source of information about SSD health may include "Fabric" (shown in example FIG. 3). In various implementations, Fabric may use SMART (Self-Monitoring, Analysis and Reporting Technology) or the like, which may be included as a portion of recovery process 10. Generally, SMART may be described as a monitoring system included in HDDs, SSDs, or other storage devices. In certain implementations, using SMART, recovery process 10 may detect and report on various indicators of drive health (e.g., drive failures) to enable the anticipation of failures. In some implementations, recovery process 10 may include a storage service (SS), which may be another example source of information about SSD health, which may perform writes to and reads from SSD (and/or HDD). In one or more implementations, recovery process 10, e.g., via SS, may keep track of I/O operation results. For instance, if a particular SSD continuously (or singularly) fails to successfully serve read/write requests, recovery process 10, e.g., via SS, may report a suspicious drive state for that particular SSD. As an example, assume that a user (e.g., user 46) uses a client computing device (e.g., client computing device 38) to send a write request to store data to a particular SSD in the clustered system. In the example, recovery process 10 may monitor whether or not the write request was successfully served by the SSD to which the request was directed. In some implementations, recovery process 10 may include a storage service manager (SSM), which may accumulate the health reports from various SSDs.

In many implementations, a state of the at least one storage device may be determined 504 by recovery process 10 based upon, at least in part, the health of the at least one storage device. For instance, and referring at least to example FIG. 6, a state machine (e.g., state machine 600) for one or more SSDs in the clustered system may be implemented by recovery process 10. In certain implementations, the state of one or more SSDs may include, e.g., "Good," "Bad,", and "Suspect."

In some implementations, the state of the at least one storage device may be determined 504 to be a first state if at least one I/O request directed to the at least one storage device fails. For example, the first state may be "Suspect." In the example, the SSD may have a "Suspect" state when recovery process 10, e.g., via Fabric, reports so and/or there was at least one I/O (e.g., read/write) failure for the SSD as monitored by recovery process 10. In certain implementations, the write cache (e.g., via recovery process 10) may limit use of such SSDs to read requests.

In some implementations, recovery process 10 may determine 504 the state of the at least one storage device to be a second state if the at least one storage device is incapable of completing I/O requests. For example, the second state may be "Bad." In the example, the SSD may have a "Bad" state when recovery process 10, e.g., via Fabric, reports so and/or the SSD is incapable of completing I/O (e.g., read/write) requests for the SSD as monitored by recovery process 10. In certain implementations, the write cache (e.g., via recovery process 10) may neither use such SSDs for write requests nor read requests.

In some implementations, the state of the at least one storage device may be determined 504 to be a third state. For example, the third state may be "Good." In the example, the SSD may have a "Good" state when recovery process 10, e.g., via Fabric, reports so and/or there were no I/O (e.g., read/write) failures for the SSD as monitored by recovery process 10. In certain implementations, the write cache (e.g., via recovery process 10) may use such SSDs for both read and write requests. In some implementations, more or less states may be included in state machine 600.

In certain implementations, a recovery journal may be maintained 502 by recovery process 10, wherein the recovery journal may identify whether one or more chunks of data stored in the cache have been dumped from the at least one storage device to persistent storage in the clustered system. In some implementations, the recovery journal may be used by recovery process 10 (e.g., via the write cache) to minimize the cost of handling possible issues with the SSDs. Generally, the cost may be defined as a number of chunks to recover when an issue is detected. As noted above, in certain implementations, any discovered issue with an SSD, by default, may generally require recovery of the entire node to which the SSD belongs. In some implementations, in order to avoid entire node content recovery, recovery process 10 may maintain (e.g., in the write cache) the recovery journal. In some implementations, for each particular storage node, recovery process 10 (e.g., via the distributed storage) may know the following, e.g.: (a) complete set of chunks stored to this node; (b) some undefined subset of chunks may reside the cache; and (c) some undefined subset of the subset of chunks may have its content in the cache only. Thus, in certain implementations, the limited information the distributed storage may have for sure is the complete set of chunks, and therefore, in case of SSD failure, any chunk from the complete set may potentially require recovery. In other implementations, recovery process 10 may maintain the appropriate information about chunks in memory in the cache; however, this information may generally be lost after such things as, e.g., node crash, restart, etc. Thus, by default, in some implementations, discovered issues with an SSD may require recovery of the entire node.

In certain implementations, the recovery journal may contain a list of chunks that are stored in SSDs and have not yet been dumped content to persistent storage (e.g., the HDD). In some implementations, recovery process 10 may add a chunk in the write cache to the recovery journal every time a new piece of data is successfully accepted in the write cache (e.g., the write cursor passes ahead of the dump cursor as shown in FIG. 4). In other implementations, recovery process 10 may remove the chunk from the recovery journal when all the chunk's content in the write cache successfully becomes in sync with its content in HDD (e.g., the dump cursor reaches the write cursor again as shown in FIG. 4). As an example, assume that a user (e.g., user 46) uses a client computing device (e.g., client computing device 38) to send a write request to store data to a particular SSD in the clustered system. In the example, if the write request results in successful storage of the data into the particular SSD in the write cache, recovery process 10 may add the data (e.g., as a chunk ID) to the recovery journal. Continuing with the example, if the data associated with the chunk's content is successfully written to HDD from the SSD write cache, recovery process 10 may remove the chunk ID from the recovery journal.

In some implementations, the recovery journal may be stored in system space (e.g., outside the SSD and storage HDD), which may enable recovery process 10 to more easily define a scope for recovery even for SSDs in Bad state. In other implementations, recovery process 10 may enable the write cache to use lock-free access to recovery journal content. In certain implementations, each item in the recovery journal may be protected with a checksum (or the like).

In some implementations, recovery process 10 may perform 506 a recovery action on the one or more chunks of data stored in the at least one storage device based upon, at least in part, the state of the at least one storage device. In certain implementations, recovery process 10 may use the write cache to create a recovery journal for each [SSD, HDD] pair that may allow fine grained failure handling to perform the recovery action. In some implementations, when some SSD is determined by recovery process 10 to have become "Suspect" or "Bad," recovery process 10 may (e.g., via the write cache) use each of the recovery journals associated with the "Suspect" or "Bad" SSD to get the list of chunks to recover. For instance, assume for example purposes only that there are 3 SSDs and 15 HDDs. In the example, there may be 3*15 unique pairs [SSD, HDD]. In certain implementations, a separate recovery journal may be created for each unique pair. In some implementations, the name of a recovery journal file may be, e.g., SSD_SYS_ID-HDD_SYS_ID.

In certain implementations, the recovery action may include recovery process 10: invalidating 512 at least a portion of the one or more chunks of data stored in the at least one storage device if the state of the at least one storage device is the second state; and recovering 514 at least a portion of the one or more chunks of data that remain in the recovery journal. For instance, assume for example purposes only that some SSD is determined by recovery process 10 to have become "Bad." In the example, recovery process 10 (e.g., via the write cache) may invalidate 512 some or all the content stored in that SSD as listed in the associated recovery journal. In certain implementations, recovery process 10 (e.g., via the write cache) may further initiates recovery 514 for some or all the chunks within the SSD that have not dumped content as listed in the associated recovery journal. In other implementations, some or all of the chunks may be deleted from the SSD. Thus, once completed, the SSD may become empty in some implementations,. In some implementations, recovery process 10 (e.g., via the write cache) may then use the reporting by Fabric to define a new state of the SSD. For instance, a SSD drive in a "Bad" or "Suspect" state may subsequently become "Good" again.

In other implementations, the recovery action may include attempting 508 to dump each of the one or more chunks of data stored in the at least one storage device to the persistent storage if the state of the at least one storage device is the first state, wherein each chunk of data successfully dumped is removed from the recovery journal. As noted above, the first state may be "Suspect." In some implementations, the SSD may have a "Suspect" state when recovery process 10, e.g., via Fabric, reports so and/or there was at least one I/O (e.g., read/write) failure for the SSD. In certain implementations, the write cache (e.g., via recovery process 10) may limit use of such SSDs to read requests. In some implementations, when some Good SSD transitions to a "Suspect" state, recovery process 10 (e.g., via the write cache) may try to minimize damage caused by the failure and attempt 508 a complete dump for all the chunks stored in the "Suspect" SSD. In other implementations, for any chunks successfully dumped to HDD from the SSD write cache, recovery process 10 may remove the chunk from the recovery journal. As a result, in certain implementations, any remaining chunks listed in the recovery journal may be identified by recovery process 10 as having failed to be dumped to HDD from the SSD write cache.

In certain implementations, the recovery action may further include recovery process 10 recovering 510 at least a portion of the one or more chunks of data that remain in the recovery journal. For instance, if the above attempt 508 is only successful in dumping a portion of the chunks stored in the "Suspect" SSD to HDD, then the chunks that were unsuccessful in being dumped from the "Suspect" SSD to HDD may still be listed in the recovery journal. In some implementations, recovery process 10 may initiates recovery 510 of those data chunks that remain in the recovery journal. After a chunk is handled by the cache, it may be deleted from the cache. In some implementations, an example of recovery process 10 handling the chunk may include, e.g., (i) try to dump not-dumped content of the cache file from the recovery journal. In some implementations, if the dump is successful, (ii) try to delete the cache file and GoTo exit, but if the dump failed, (iii) recover chunk content using its remote copies, (e.g., the two mirror copies that may be stored to some other storage nodes). (iv) In certain implementations, if recovery using remote copies is successful, (v) try to delete the cache file and GoTo exit, but if recovery using remote copies failed, (vi) report an unrecoverable chunk and GoTo exit. Thus, in some implementations, at the end the SSD becomes empty. Then, in certain implementations, the cache uses the reporting by Fabric to define a new state of the SSD. In particular, in some implementations, a drive in Suspect state may become Good again.

In other implementations, after the remaining chunks are handled (e.g., recovered and dumped) by recovery process 10, they may be deleted from the SSD. Thus, once completed, the SSD may become empty. In some implementations, recovery process 10 (e.g., via the write cache) may then use the reporting by Fabric to define a new state of the SSD. For instance, in certain implementations, the SSD drive in the "Suspect" state may subsequently become "Good" again.

In some implementations, the recovery action may include restoring 516 the recovery journal from a file system on the at least one storage device if the recovery journal is one of corrupted and lost. For instance, in certain implementations, when recovery process 10 detects that a recovery journal is corrupted or lost, recovery process 10 may try to restore 516 the journal content from the file system, which may be located on the corresponding SSD. In some implementations, the way the SSD file system is organized may help make this task more feasible. Referring at least to the example implementation of FIG. 7, a SSD file system layout (e.g., SSD file system layout 700) is shown. In some implementations, SSD file system layout 700 may include a directory for each HDD connected to the node. Therefore, in certain implementations, if a recovery journal for some SSD and HDD pair (e.g., SSD A and HDD B) is lost, then its content may be restored 516 by recovery process 10 via listing of B directory on A drive. As such, in the example implementations, recovery process 10 may have two sources of information about its write cache content, e.g., a set of recovery journals and SSD file system. In certain implementations, recovery process 10 may enable the write cache to assure consistency of these two views on its content. In some implementations, on startup, recovery process 10 may synchronize the write cache's recovery journals and file systems on the SSDs.

In certain implementations, in case of a conflict, recovery process 10 may prioritize the recovery journal as a more trusted source of information than the file system. For example, if the view of the content in the recovery journal does not match the view of the content in the file system, recovery process 10 may use the recovery journal, rather than the file system, for recovery purposes.

As noted above, in some implementations, any discovered issue with an SSD, by default, may generally require recovery of the entire node to which the SSD belongs. In some implementations, however, in order to avoid entire node content recovery, recovery process 10 may maintain (e.g., in the write cache) the recovery journal. Thus, in certain implementations, rather than the default requirement for recovery of the entire node to which the SSD belongs upon any discovered issue with an SSD, recovery process 10 may simply require recovery of the entire node in the rare case when there is a recovery journal corruption/loss for a SSD in "Bad" state. As such, in some implementations, recovery process 10 may enable timely detection of hardware issues and minimal overhead associated with handling the detected issues.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    monitoring health of at least one storage device of a cache in a clustered system;
    maintaining a recovery journal, wherein the recovery journal identifies whether one or more chunks of data stored in the cache have been dumped from the at least one storage device to persistent storage in the clustered system;
    determining a state of the at least one storage device based upon, at least in part, the health of the at least one storage device, wherein the state of the at least one storage device is determined to be a second state if the at least one storage device is incapable of completing I/O requests; and
    performing a recovery action on the one or more chunks of data stored in the at least one storage device based upon, at least in part, the state of the at least one storage device, wherein the recovery action includes:
        invalidating at least a portion of the one or more chunks of data stored in the at least one storage device if the state of the at least one storage device is the second state; and
        recovering at least a portion of the one or more chunks of data that remain in the recovery journal.

2. The computer-implemented method of claim 1 wherein the state of the at least one storage device is determined to be a first state if at least one I/O request directed to the at least one storage device fails.

3. The computer-implemented method of claim 2 wherein the recovery action includes attempting to dump each of the one or more chunks of data stored in the at least one storage device to the persistent storage if the state of the at least one storage device is the first state, wherein each chunk of data successfully dumped is removed from the recovery journal.

4. The computer-implemented method of claim 3 wherein the recovery action further includes recovering at least a portion of the one or more chunks of data that remain in the recovery journal.

5. The computer-implemented method of claim 1 wherein the recovery action includes restoring the recovery journal from a file system on the at least one storage device if the recovery journal is one of corrupted and lost.

6. A computer program product residing on a non-transitory computer readable storage medium having a plurality of instructions stored thereon which, when executed across one or more processors, cause at least a portion of the one or more processor to perform operations comprising:
    monitoring health of at least one storage device of a cache in a clustered system;
    maintaining a recovery journal, wherein the recovery journal identifies whether one or more chunks of data stored in the cache have been dumped from the at least one storage device to persistent storage in the clustered system;
    determining a state of the at least one storage device based upon, at least in part, the health of the at least one storage device, wherein the state of the at least one storage device is determined to be a first state if at least one I/O request directed to the at least one storage device fails; and
    performing a recovery action on the one or more chunks of data stored in the at least one storage device based upon, at least in part, the state of the at least one storage device, wherein the recovery action includes attempting to dump each of the one or more chunks of data stored in the at least one storage device to the persistent storage if the state of the at least one storage device is the first state, wherein each chunk of data successfully dumped is removed from the recovery journal.

7. The computer program product of claim 6 wherein the recovery action further includes recovering at least a portion of the one or more chunks of data that remain in the recovery journal.

8. The computer program product of claim 6 wherein the state of the at least one storage device is determined to be a second state if the at least one storage device is incapable of completing I/O requests.

9. The computer program product of claim 8 wherein the recovery action further includes:
   invalidating at least a portion of the one or more chunks of data stored in the at least one storage device if the state of the at least one storage device is the second state; and
   recovering at least a portion of the one or more chunks of data that remain in the recovery journal.

10. The computer program product of claim 6 wherein the recovery action includes restoring the recovery journal from a file system on the at least one storage device if the recovery journal is one of corrupted and lost.

11. A computing system including one or more processors and one or more memories configured to perform operations comprising:
    monitoring health of at least one storage device of a cache in a clustered system;
    maintaining a recovery journal, wherein the recovery journal identifies whether one or more chunks of data stored in the cache have been dumped from the at least one storage device to persistent storage in the clustered system;
    determining a state of the at least one storage device based upon, at least in part, the health of the at least one storage device, wherein the state of the at least one storage device is determined to be a second state if the at least one storage device is incapable of completing I/O requests; and
    performing a recovery action on the one or more chunks of data stored in the at least one storage device based upon, at least in part, the state of the at least one storage device, wherein the recovery action includes:
       invalidating at least a portion of the one or more chunks of data stored in the at least one storage device if the state of the at least one storage device is the second state; and
       recovering at least a portion of the one or more chunks of data that remain in the recovery journal.

12. The computing system of claim 11 wherein the state of the at least one storage device is determined to be a first state if at least one I/O request directed to the at least one storage device fails.

13. The computing system of claim 12 wherein the recovery action includes attempting to dump each of the one or more chunks of data stored in the at least one storage device to the persistent storage if the state of the at least one storage device is the first state, wherein each chunk of data successfully dumped is removed from the recovery journal.

14. The computing system of claim 13 wherein the recovery action further includes recovering at least a portion of the one or more chunks of data that remain in the recovery journal.

15. The computing system of claim 11 wherein the recovery action includes restoring the recovery journal from a file system on the at least one storage device if the recovery journal is one of corrupted and lost.

\* \* \* \* \*